US011919752B2

(12) United States Patent
Mourin et al.

(10) Patent No.: US 11,919,752 B2
(45) Date of Patent: Mar. 5, 2024

(54) METHOD FOR SECURING A TILTING JIB CRANE FOR SECURING AN ANGULAR POSITION OF A TILTING JIB

(71) Applicant: MANITOWOC CRANE GROUP FRANCE, Dardilly (FR)

(72) Inventors: Florent Mourin, Chasselay (FR); Vincent Veillerot, Tassin la Demi Lune (FR); François Lemire, Soucieu en Jarrest (FR); Vincent Degeorge, Saint Etienne (FR)

(73) Assignee: MANITOWOC CRANE GROUP FRANCE, Dardilly (FR)

( * ) Notice: Subject to any disclaimer, the term of this patent is extended or adjusted under 35 U.S.C. 154(b) by 19 days.

(21) Appl. No.: 17/681,711

(22) Filed: Feb. 25, 2022

(65) Prior Publication Data

US 2022/0267121 A1 Aug. 25, 2022

(30) Foreign Application Priority Data

Feb. 25, 2021 (FR) ...................................... 21/01846

(51) Int. Cl.
*B66C 23/82* (2006.01)
*B66C 13/22* (2006.01)
*B66C 23/36* (2006.01)

(52) U.S. Cl.
CPC .............. *B66C 23/82* (2013.01); *B66C 13/22* (2013.01); *B66C 23/36* (2013.01); *B66C 2700/0392* (2013.01)

(58) Field of Classification Search
CPC ......... B66C 23/82; B66C 13/22; B66C 15/00; B66D 1/54; B66D 5/32
See application file for complete search history.

(56) References Cited

U.S. PATENT DOCUMENTS 5,004,177 A * 4/1991 Somers .................... B66D 5/32 242/395
7,226,038 B1 * 6/2007 Wickstrom .............. B66D 5/32 254/375

(Continued)

FOREIGN PATENT DOCUMENTS

CN 101439828 B 9/2011
CN 103407927 A 11/2013

(Continued)

OTHER PUBLICATIONS

EP 2,796,403 A1 Machine Translation. (Year: 2014).*
Search Report issued in connection with FR Pat. Appl. 21/01846, dated Nov. 10, 2021.

*Primary Examiner* — Michael R Mansen
*Assistant Examiner* — Juan J Campos, Jr.
(74) *Attorney, Agent, or Firm* — Cook Alex Ltd.

(57) ABSTRACT

A method for securing an angular position of a crane jib displaceable in lifting and in lowering by a winch integrating a motor driving a drum on which is wound a rope and secured to a platen provided with arcuate oblong locking holes, the method including measuring a speed parameter representative of an angular speed of the jib, controlling the motor to displace the jib with a limitation of the speed parameter to a first maximum value and a limitation of a motor torque to a first limit value, until reaching an angular position in which a lock is aligned with and locked into the locking hole, and controlling the motor to displace the jib in lowering with a limitation of the speed parameter to a second maximum value and a limitation of the motor torque to a second limit value, until the speed parameter is null for a predetermined time period to stop the motor.

14 Claims, 2 Drawing Sheets

(56) References Cited

U.S. PATENT DOCUMENTS

| | | | | |
|---|---|---|---|---|
| 10,336,408 | B1 * | 7/2019 | Jankowski | B66D 5/32 |
| 2014/0262693 | A1 * | 9/2014 | de Lore | B66D 1/30 198/813 |
| 2018/0237277 | A1 * | 8/2018 | Key | B66D 5/34 |
| 2019/0092606 | A1 * | 3/2019 | Larmonier | B66C 23/82 |

FOREIGN PATENT DOCUMENTS

| | | | | |
|---|---|---|---|---|
| EP | 2796403 | A1 * | 10/2014 | B66D 5/32 |
| EP | 3375748 | A1 | 9/2018 | |
| EP | 3466865 | A1 | 4/2019 | |

* cited by examiner

METHOD FOR SECURING A TILTING JIB CRANE FOR SECURING AN ANGULAR POSITION OF A TILTING JIB

The invention relates to a method for securing a tilting jib crane in order to secure an angular position of a tilting jib.

The invention pertains in the field of tilting jib cranes equipped with a tilting winch comprising a tilt motor driving a drum on which is wound a tilting rope coupled to the tilting jib to drive it in angular displacement relative to the horizontal.

Two models of crane may be concerned by the invention, namely a luffing jib crane and a self-erecting crane.

A luffing jib crane is a crane comprising a mast at the top of which is pivotally mounted a jib which may be lifted and lowered, in other words the jib may pivot at the level of the mast in order to be lifted, possibly to an almost vertical angular position, and to be lowered to a horizontal angular position. This jib is displaceable in elevation and lowering by means of a tilting winch, also called a lifting winch, integrating a motor driving a drum on which is wound a tilting rope coupled to the jib, also called a lifting rope.

A self-erecting crane, also called a folding crane, collapsible crane or transportable crane, is a crane comprising a mast supporting a jib, such a self-erecting crane being configurable between a transport configuration in which the mast and the jib are folded on themselves or side-by-side, and a working configuration in which the mast and the jib are unfolded to perform load lifting and distribution operations. This jib is displaceable in lifting and in lowering, to be able to be folded and unfolded, by means of a tilting winch, also called retaining winch, integrating a motor driving a drum on which is wound a tilting rope coupled to the jib, also called a retaining rope.

The invention focuses on the locking of a tilting jib in a desired angular position, in order to hold or retain it securely and reliably in this angular position, more or less tilted with respect to the horizontal.

During the phases of angular displacement of the tilting jib, in other words when it is lifted or lowered to modify its angular position, it is known to ensure the movement and immobilization of the tilting jib by means of the motor (also called tilt motor) and an associated motor brake. On the contrary, once the angular position has been reached, it is important to secure it in order to make the configuration of the crane more reliable.

For such a maintaining, it is known to use a locking system of the tilting winch which comprises, on the one hand, a locking platen secured to the drum and provided with circumferentially distributed locking holes and in a circular shape and, on the other hand, a lock of cylindrical section complementary with the locking holes, wherein this lock is mounted on a fixed chassis or frame and is movable between:

- a locking configuration in which the lock is engaged in one of the locking holes to block the rotation of the drum and thus lock the maintaining of the jib in a desired angular position; and
- a release configuration in which the lock is disengaged from the locking holes to release the rotation of the drum and thus allow lifting/lowering of the jib.

Such a solution, however, presents difficulties, the first of which is that, in order to be able to engage the lock in a locking hole, the operator must align them precisely, which involves a control of the tilt motor by pulse which is actually less precise. A second difficulty is that, in order to be able to disengage the lock from the locking hole, the force exerted by the locking platen, secured to the drum, on the lock is very important, thus requiring manual intervention to rotate the drum and release the effort on the lock, which is both impractical and prone to human error in the intervention.

The invention aims at providing a solution for being able to securely and reliably maintain an angular position of a tilting jib, which involves a minimum of human intervention, and which offers a simplification of the locking/unlocking operations of the tilting winch.

To this end, the invention suggests a securing method for a tilting jib crane in order to secure an angular position of a tilting jib, this tilting jib being displaceable in lifting and in lowering by means of a tilting winch comprising a tilt motor driving a drum on which is wound a tilting rope coupled to the tilting jib, this drum being secured in rotation with a locking platen provided with locking holes circumferentially distributed, this securing method implements a locking phase in which a lock is displaced:

- from a release configuration in which the lock is disengaged from the locking platen to authorize the rotation of the drum and thus allow lifting/lowering of the tilting jib,
- to a locking configuration in which the lock is engaged inside one of the locking holes, after alignment, to block the rotation of the drum and thus secure the angular position of the tilting jib;

this method for securing a tilting jib crane being remarkable in that the locking holes are all oblong arcuate shaped so that the lock is engaged with circumferential clearance within a locking hole in a locking configuration.

Thus, the invention suggests first of all to use a locking platen whose locking holes are oblong and arcuate, that is to say are in the shape of an arc of a circle centered on the axis of rotation of the drum, which allows the lock to be able to be engaged in a locking hole with a circumferential clearance which facilitates locking and authorize a slight rotation of the drum; this circumferential clearance being dependent on the length of the locking holes and on the section of the lock.

Advantageously, the securing method comprises the following steps:

- measurement of a speed parameter representative of an angular speed of displacement of the tilting jib, in lifting or in lowering;
- first control of the tilt motor to displace the tilting jib in lifting or in lowering, with a limitation of the speed parameter to a first maximum speed value and a limitation of a motor torque of the tilt motor to a first value torque limit, until a given angular position of the tilting jib is reached, in which the lock is aligned with one of the locking holes of the locking platen, said lock occupying the release configuration;
- implementation of the locking phase by displacing the lock from the release configuration to the locking configuration;
- second control of the tilt motor to displace the tilting jib in lowering, with a limitation of the speed parameter to a second maximum speed value, which is lower than the first maximum speed value, and a limitation of the motor torque of the tilt motor to a second torque limit value, which is less than the first torque limit value, until the speed parameter is zero for a predetermined time to stop the tilt motor.

Afterwards, the invention suggests to automate at least partially the locking, with the first control of the tilt motor which aims at reaching the desired angular position, by lifting/lowering the tilting jib with a speed parameter constrained to the first maximum speed value (which preferably corresponds to the mechanically authorized maximum value) and with a motor torque limited to the first torque limit value; such a first torque limit value being a high value allowing the tilt motor to take up the forces in all the angular positions of the tilting jib.

Then, once the lock is locked in one of the oblong arcuate shaped locking holes, the second control of the tilt motor aims to slightly lower the tilt jib until the lock abuts against one end of the locking hole. This lowering takes place with a speed parameter limited to the second maximum speed value (in other words at low speed), this second maximum speed value being adapted to the distance that might be traveled (at most the length of the locking hole) and to the precision necessary for the proper execution of the maneuver. During this second control, the motor torque is itself limited to the second torque limit value. Once the lock is in abutment, the motor torque is still limited to the second torque limit value and the tilt motor continues to force to this second torque limit value, while the speed parameter is zero (indeed, due to the lock abutment, the drum no longer rotates and the jib no longer lowers). This zero speed phase will last for the predetermined duration (for example a few seconds) before the tilt motor is stopped, and thus the tilting winch is locked.

It should also be noted that the speed parameter could correspond to the angular speed of displacement of the tilting jib, or to another speed or another parameter that depends on this angular speed, such as for example a rotational speed of the drum, motor speed, etc.

According to one feature, a validation by an operator that the lock occupies the locking configuration is implemented in order to authorize the second control of the tilt motor.

According to one variant, the displacement of the lock, between the locking configuration and the release configuration, is operated manually by an operator.

According to another feature, a detection by a detection system that the lock occupies the locking configuration is implemented in order to authorize the second control of the tilt motor.

According to one variant, the displacement of the lock, between the locking configuration and the release configuration, is operated by means of an actuator.

In a particular embodiment, after the second control of the tilt motor, a release phase is implemented with the following steps:

- third control of the tilt motor to displace the tilting jib in lifting, with a limitation of the speed parameter to the second maximum speed value and a limitation of the motor torque of the tilt motor to the second torque limit value;
- displacement of the lock from the locking configuration to the release configuration.

In other words, to unlock the tilting winch, it is again suggested to operate at low speed, in other words with a speed parameter constrained to the second maximum speed value, and with a limitation of the motor torque to the second value torque limit, and to lift the tilting jib slightly, to take off the lock from its support on the end of the locking hole, and thus allow the lock to be disengaged effortlessly from the locking hole.

According to one possibility, the third control of the tilt motor is followed, before or after the displacement of the lock to the release configuration, by a closure of a motor brake associated with the tilt motor.

Thus, the motor brake is closed, upon completion of the release phase, in order to retain the tilting jib thanks to this motor brake, before opening it to operate an angular displacement of the tilting jib, for example to fold it or to reach a new angular position.

According to another possibility, the displacement of the lock to the release configuration is followed by a fourth control of the tilt motor to displace the tilt jib in lifting or in lowering, with a limitation of the speed parameter to the first maximum value of speed and a limitation of the motor torque to the first torque limit value.

In other words, once the tilting winch is unlocked, the tilting jib could be displaced again at high speed, i.e. with a restriction of the speed parameter to the first maximum speed value, and with a motor torque adapted to take up the forces. Wherein appropriate, the motor brake is opened to be able to operate the fourth control of the tilt motor.

According to another possibility, a validation by an operator that the lock occupies the release configuration is implemented to authorize the fourth control of the tilt motor.

According to another possibility, a detection by a detection system that the lock occupies the release configuration is implemented in order to authorize the fourth control of the tilt motor.

Advantageously, while considering that the locking holes each extend over a given locking angular sector, the first control of the tilt motor followed by the forward displacement of the lock causes said lock to be substantially in the middle of the locking hole, and the second control of the tilt motor causes the drum to rotate in a lowering direction along an angular lowering sector substantially equivalent to half of the angular locking sector.

In a particular embodiment, the third control of the tilt motor causes the drum to rotate in a lifting direction, opposite to the lowering direction, according to an angular tilting sector substantially equivalent to half of the angular locking sector. Within the context of the invention, by "substantially equivalent" it should be understood exactly equivalent or equivalent to more or less 15% of the length of the locking hole.

In an advantageous application, the tilting jib crane is a luffing jib crane or a self-erecting crane.

An advantageous use of the invention for a self-erecting crane is to make the maintaining of the jib locked and reliable once unfolded, in other words in its working configuration.

An advantageous use of the invention for a luffing jib crane is to make the holding of the jib locked and reliable in any of the tilted configurations of the jib, in other words independently of its tilting.

The invention also relates to a tilting jib crane comprising a tilting jib displaceable in lifting and in lowering by means of a tilting winch integrating a tilt motor driving a drum on which is wound a tilting rope coupled to the tilting jib, this drum being secured in rotation with a locking platen provided with circumferentially distributed locking holes, and further comprising a lock displaceable between:

- a release configuration in which it is disengaged from the locking platen to authorize the rotation of the drum and thus allow lifting/lowering of the tilting jib; and
- a locking configuration in which it is engaged inside a locking hole to block the rotation of the drum and thus secure the angular position of the tilting jib;

said tilting jib crane being remarkable in that the locking holes are all oblong arcuate shaped so that the lock is engaged with a circumferential clearance within a locking hole in the locking configuration.

Advantageously, the tilting jib crane comprises a measurement system for measuring a speed parameter representative of an angular speed of displacement of the tilting jib, in lifting or lowering, and a monitoring/control system connected to the tilt motor and to the measurement system, this monitoring/control system being configured to:

perform a first control of the tilt motor to displace the tilting jib in lifting or in lowering, with a limitation of the speed parameter to a first maximum speed value and a limitation of a motor torque of the tilt motor to a first torque limit value, until a given angular position of the tilting jib is reached, in which the lock is aligned with one of the locking holes of the locking platen, said lock occupying the release configuration;

after a forward displacement of the lock to occupy a locking configuration in which it is engaged inside the locking hole on which it is aligned, perform a second control of the tilt motor to displace the tilting jib in lowering, with a limitation of the speed parameter to a second maximum speed value, which is less than the first maximum speed value, and a limitation of the motor torque of the tilt motor to a second torque limit value, which is less than the first torque limit value, until the speed parameter is zero for a predetermined time to stop the tilt motor.

Other features and advantages of the present invention will appear upon reading the detailed description hereinafter, of a non-limiting example of implementation, made with reference to the appended figures in which.

Figure 1:
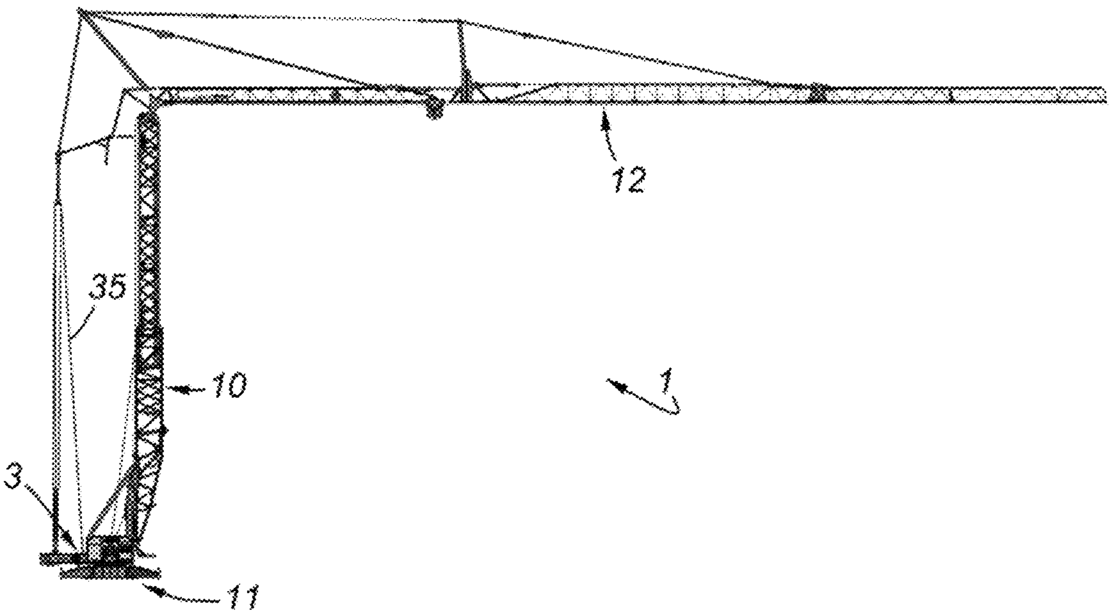
FIG. 1 is a schematic view of a tilting jib crane, of the self-erecting crane type, suited for the invention.

Referring to FIG. 1, a first tilting jib crane 1 according to the invention is a self-erecting crane, hereinafter called crane 1, which comprises a mast 10 mounted on a platform 11, for example a rotating platform, and supporting a jib 12 of the tilting jib type. The mast 10 may be a foldable mast or a telescopic mast (as in the illustrated example) and the jib 12 is a foldable jib comprising a series of jib elements hinged to each other.

This crane 1 is configurable between:

a transport configuration in which the mast 10 and the jib 12 are folded onto themselves or side-by-side, substantially horizontal; and a working configuration (illustrated in FIG. 1) in which the mast 10 and the jib 12 are unfolded, with the mast 10 being substantially vertical and the jib 12 being substantially horizontal.

The crane 1 thus comprises a folding/unfolding mechanism which acts on the mast 10 and the jib 12 to fold and unfold the crane 1 and thus to move it from the working configuration to the transport configuration, and vice versa. The jib 12 is thus tilting to the extent that, during configuration changes between the transport configuration and the working configuration, the jib 12 is more or less tilted in order to be unfolded or folded up. This folding/unfolding mechanism thus comprises a tilting winch 3 (also called a retaining winch for this self-erecting crane model) which acts on a tilting rope 35 (also called a retaining rope for this self-erecting crane model) coupled to the jib 12, via return members such as pulleys and/or tie rods. In the illustrated example, the tilting winch 3 of the crane 1 is disposed on the platform 11.

Figure 2:
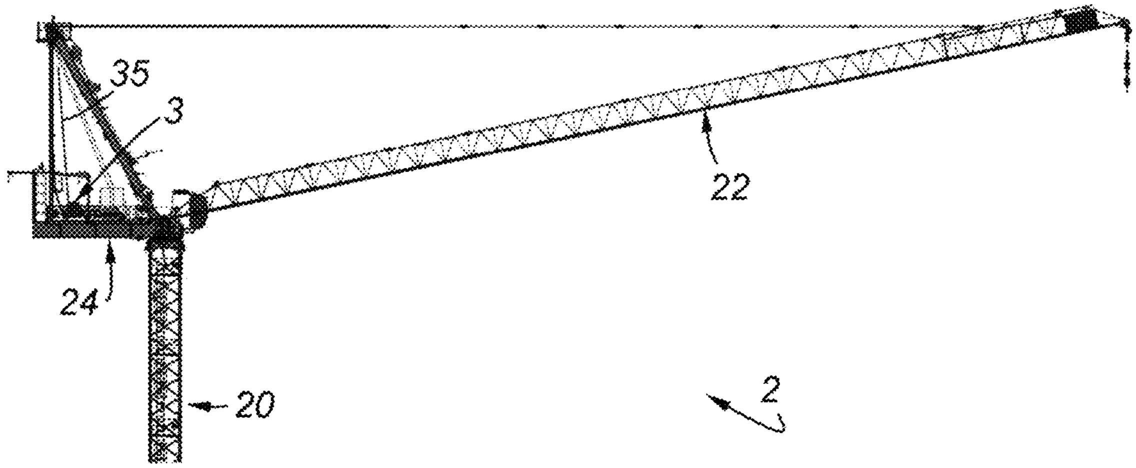
FIG. 2 is a partial schematic view of a tilting jib crane, of the luffing jib crane type, also suited for the invention.

Referring to FIG. 2, a second tilting jib crane 2 according to the invention is a luffing jib crane, hereinafter called crane 2, which comprises a mast 20 mounted on a platform (not visible) and supporting the tilting jib 22 pivotally mounted on the top of the mast 20 along a horizontal axis. Thus, in the working configuration, the jib 22 may pivot to be lifted, possibly to an almost vertical angular position, and to be lowered to a horizontal angular position.

This crane 2 may be configured in different angular configurations depending on whether the jib 22 is more or less lifted or lowered, between:

a lifted configuration in which the jib 22 is lifted to the maximum in an almost vertical angular position; and a lowered configuration in which the jib 22 is lowered into a horizontal angular position.

The crane 2 thus comprises a lifting/lowering mechanism which acts on the jib 22 to drive it in angular displacement with respect to the horizontal. The jib 22 is thus tilting to the extent that it may be more or less tilted. This lifting/lowering mechanism thus comprises a tilting winch 3 (also called lifting winch for this luffing jib crane model) which acts on a tilting rope 35 (also called lifting rope for this luffing jib crane model) coupled to the jib 22, via return members such as pulleys and/or tie rods. In the illustrated example, the tilting winch 3 of the crane 2 is disposed on a counter-jib 24, which prolongs the jib 22 at the level of the top of the mast 20.

Figure 3:
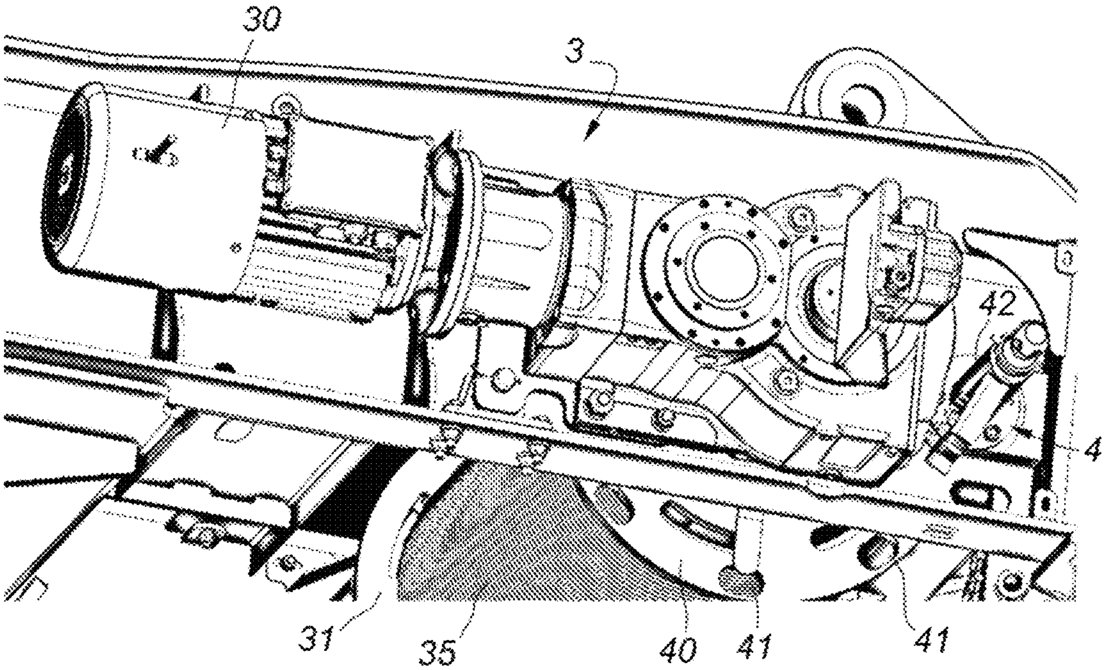
FIG. 3 is a schematic view of a tilting winch for a tilting jib crane according to the invention, such as for example those represented in FIGS. 1 and 2.

The same reference numerals will be used to describe the tilting winch 3 and its constituent elements, whether for the crane 1 and for the crane 2. Referring to FIG. 3, this tilting winch 3 comprises a tilt motor 30 driving a drum 31 on which is wound the tilting rope 35 coupled to the jib 12, 22. A rotation of the drum 31 in a lifting direction leads to a winding of the tilting rope 35 around the drum in order to ensure a lifting of the jib 12, 22. A rotation of the drum 31 in a lowering direction, opposite to the lifting direction, leads to an unwinding of the tilting rope 35 around the drum 31 in order to ensure a lowering of jib 12, 22.

Figure 4:
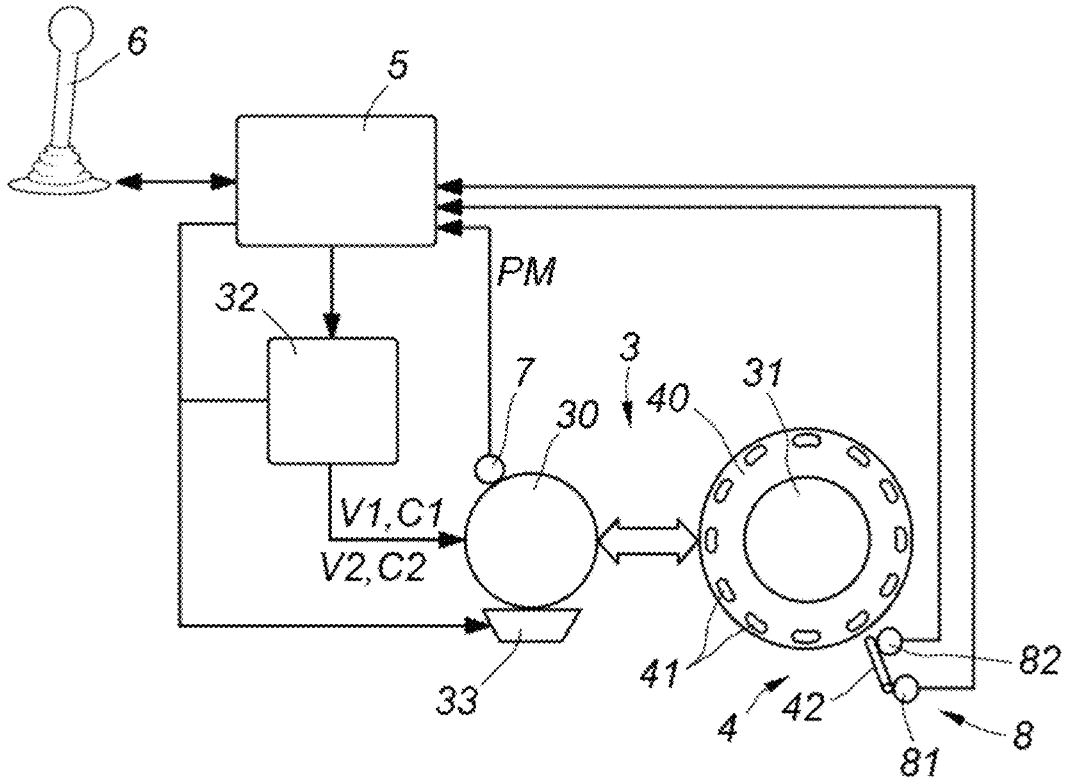
FIG. 4 is a schematic view of the main elements necessary for the implementation of the securing method according to the invention.

Referring to FIG. 4, the tilting winch 3 comprises the tilt motor 30, which is a rotary electric motor, which is driven by a frequency converter 32, serving as a speed driver. The tilting winch 3 further comprises a motor brake 33, associated with the tilt motor 30. The closure of the motor brake 33 immobilizes the rotation of the tilt motor 30 and the drum 31, whereas the opening of this motor brake 33 authorizes the free rotation of the tilt motor 30 and the drum 31. In particular, turning on the tilt motor 30 is accompanied with an opening of the motor brake 33, whereas stopping this tilt motor 30 is accompanied by the closure of the motor brake 33.

The crane also comprises a monitoring/control system 5 connected to the frequency converter 32 for a monitoring of the motor speed of the tilt motor 30, whether when lifting or lowering, and thus a monitoring of the speed of angular displacement of the jib 12, 22, in lifting and in lowering. This monitoring/control system 5 is also connected to the motor brake 33 to control opening/closure thereof. The monitor/control system 5 is also connected to a control device 6, used to control the functions of the crane 1, 2 by a driver or crane operator, so that the monitoring/control system 5 receives instructions from the control device 6 for controlling the tilt motor 30 via the frequency converter 32.

Referring to FIG. 3, the crane further comprises a locking system 4 adapted to lock the tilting winch 3, and more specifically adapted to lock the rotation of the drum 31. This locking system 4 comprises a locking platen 40 secured to the drum 31 and provided with circumferentially distributed locking holes 41, wherein each of these locking holes 41 is of arcuate oblong shape. Thus, each locking hole 41 extends over a given locking angular sector, for example of the order of 3 to 10 degrees. The locking holes 41 are evenly distributed, being spaced from each other along a circular contour centered on the axis of rotation of the drum 31. The locking platen 40 has at least six locking holes 41, or even between 6 and 20 locking holes 41. Each locking hole 41 has two opposite ends, and has a given width measured in a radial direction starting from the axis of rotation of the drum 31.

This locking system also comprises a lock 42 mounted on a fixed chassis or frame, and this lock 42 is displaceable in translation in a direction parallel to the axis of rotation of the drum 31, between:

- a release configuration in which it is disengaged from the locking platen 40 to authorize the rotation of the drum 31 and thus allow a lifting/lowering of the jib 12, 22; and
- a locking configuration in which it is engaged inside a locking hole 41 to block the rotation of the drum 31 and thus secure the angular position of the jib 12, 22.

A forward displacement of the lock 42 moves the lock 42 from the release configuration to the locking configuration, and a backward displacement of the lock 42 moves the lock 42 from the locking configuration to the release configuration. It should be noted that the displacement of the lock 42 may be performed by means of an actuator, controlled by the monitoring/control system 5, or may be performed manually by an operator on site.

This lock 42 is in the form of a cylindrical rod, having a diameter substantially equivalent, within mounting tolerance, to the width of the locking holes 41, and less than the length of the locking holes 41 so that, in locking configuration, the lock 42 is engaged with a circumferential clearance inside a locking hole 41. Thus, when the lock 42 is engaged in a locking hole 41, the drum 31 has a degree of freedom in rotation between two extreme positions of the lock 42 in abutment on the two respective opposite ends of the locking hole 41.

The crane also comprises a measurement system 7 for measuring a speed parameter PM representative of an angular speed of displacement of the jib 12, 22, in lifting or in lowering, wherein the monitoring/control system 5 is connected to the measurement system 7 to receive the measurements of the speed parameter PM. It should be noted that the speed parameter PM could correspond to the angular speed of displacement of the jib 12, 22, or else to another speed or another parameter which depends on this angular speed, such as for example a rotational speed of the drum 31, a motor speed, a speed set-point, etc.

Optionally, the crane may comprise a detection system 8 detecting whether the lock 42 occupies the locking configuration or the release configuration, wherein the monitoring/control system 5 is connected to the detection system 8 to receive an item if information about the configuration occupied by the lock 42. Referring to FIG. 4, this detection system 8 could comprise a first detector 81 detecting the lock 42 in the locking configuration and/or a second detector 82 detecting the lock 42 in the release configuration. The or each detector 81, 82 may be of the proximity, contact, acoustic or visual sensor-type, etc.

In order to lock and secure an angular position of the jib 12, 22, the monitoring/control system 5 is configured to perform a first control of the tilt motor 30 to displace the jib 12, 22 in lifting or in lowering, with a limitation of the speed parameter PM to a first maximum speed value V1 and a limitation of a motor torque of the tilt motor 30 to a first torque limit value C1, until a given angular position of the jib 12, 22 is reached, in which the lock 42 is aligned with one of the locking holes 41 of the locking platen 40, the lock occupying the release configuration.

In other words, this first control of the tilt motor 30 makes it possible to reach the desired angular position of the jib 12, 22, before locking the tilting winch 3 by the locking system 4. Advantageously, the first control of the tilt motor 30 followed by the forward displacement of the lock 42 cause this lock 42 to be substantially in the middle of the locking hole 41, so that this lock 42 is spaced from each of the ends of the concerned locking hole 41.

After a forward displacement of the lock 42 to occupy a locking configuration in which it is engaged inside the locking hole 41 on which it is aligned, the monitoring/control system 5 is configured to perform a second control of the tilt motor 30 to displace the jib 12, 22 in lowering, with a limitation of the speed parameter to a second maximum speed value V2, which is lower than the first maximum speed value V1, and a limitation of the motor torque of the tilt motor 30 to a second torque limit value C2, which is lower than the first torque limit value C1, until the speed parameter PM is zero for a predetermined time period to stop the tilt motor 30.

In other words, this second control of the tilt motor 30 makes it possible to rotate the drum 31 in the lowering direction, which is possible due to the circumferential clearance of the lock 42 inside the locking hole 41, until the lock 42 is in abutment against one of the ends of the locking hole 41. Therefore, once the lock 42 is in abutment, the rotation of the drum 31 and of the tilt motor 30 is blocked, so that the speed parameter PM is zero, and this for the predetermined time period, and it is only at the end of this predetermined time period with a zero speed parameter PM that the monitoring/control system 5 controls the stopping of the tilt motor 30.

According to one possibility, the monitoring/control system 5 implements the second control of the tilt motor 30 on the condition of detection by the detection system 8 that the lock 42 occupies the locking configuration. In other words, a detection by the detection system 8 that the lock 42 occupies the locking configuration is implemented in order to authorize the second control of the tilt motor 30.

Alternatively or complementarily, a validation by an operator that the lock 42 occupies the locking configuration is implemented in order to authorize the second control of the tilt motor 30. In other words, in order to authorize the second control of the tilt motor 30, it is necessary that the operator confirms that the lock 42 is in the locking configuration; it is for example the operator who displaced the lock 42 on site to the locking configuration.

It may be considered that the monitoring/control system 5 operates a closure of the motor brake 33, at the end of the first control of the tilt motor 30 and before moving the lock 42 in the locking configuration. Then, the monitoring/control system 5 operates an opening of the motor brake 33 once the lock 42 is in the locking configuration, to allow the second control of the tilt motor 30. Upon completion of the second control of the tilt motor 30, the motor brake 33 is kept open.

To unlock and release the angular position of the jib 12, 22, the monitoring/control system 5 is configured to implement a release phase starting with a third control of the tilt motor 30 to displace the jib 12, 22 in lifting, with a limitation of the speed parameter to the second maximum speed value V2 and a limitation of the motor torque of the tilt motor 30 to the second torque limit value C2.

In other words, this third control of the tilt motor 30 makes it possible to rotate the drum 31 in the lifting direction, so that the lock 42 lifts off from its abutment against one of the ends of the locking hole 41, yet without coming in abutment against the other of the ends of the locking hole 41. Advantageously, the third control of the tilt motor 30 causes this lock 42 to return substantially to the middle of the locking hole 41, before being displaced to the release configuration.

In the release phase, the third control of the tilt motor 30 is followed by the rearward displacement of the lock 42 from the locking configuration to the release configuration. It may be considered that the monitoring/control system 5 operates a closure of the motor brake 33, at the end of the third control of the tilt motor 30 and before moving the lock 42 in the release configuration.

Upon completion of the release phase, the jib 12, 22 may again be displaced angularly, and also the monitoring/control system 5 operates, after the displacement of the lock 42 to the release configuration, an opening of the motor brake 33 (assuming that this motor brake 33 has been closed) and then operates a fourth control of the tilt motor 30 to displace the jib 12, 22 in lifting or in lowering, with a limitation of the speed parameter to the first value maximum speed V1 and a limitation of the motor torque to the first torque limit value C1.

The invention claimed is:

1. A securing method for a tilting jib crane to secure an angular position of a tilting jib, the tilting jib being displaceable in lifting and in lowering by a tilting winch comprising a tilt motor driving a drum on which is wound a tilting rope coupled to the tilting jib, the drum being secured in rotation with a locking platen provided with locking holes circumferentially distributed, the securing method implementing a locking phase in which a lock is displaced:

from a release configuration in which said lock is disengaged from the locking platen to authorize the rotation of the drum and thus allow lifting/lowering of the tilting jib, and to a locking configuration in which said lock is engaged inside one of the locking holes, after alignment, to block the rotation of the drum and thus secure the angular position of the tilting jib, wherein the locking holes are all oblong arcuate shaped so that the lock is engaged with a circumferential clearance within a locking hole in the locking configuration, wherein the securing method further comprises:

measurement of a speed parameter representative of an angular speed of displacement of the tilting jib, in lifting or in lowering;

first control of the tilt motor to displace the tilting jib in lifting or in lowering, with a limitation of the speed parameter to a first maximum speed value and a limitation of a motor torque of the tilt motor to a first torque limit value, until a given angular position of the tilt jib is reached, in which the lock is aligned with one of the locking holes of the locking platen, the lock occupying the release configuration;

implementation of the locking phase by displacing the lock from the release configuration to the locking configuration; and second control of the tilt motor to displace the tilting jib in lowering, with a limitation of the speed parameter to a second maximum speed value, which is lower than the first maximum speed value, and a limitation of the motor torque of the tilt motor to a second torque limit value, which is lower than the first torque limit value, until that the speed parameter is zero for a predetermined time period to stop the tilt motor.

2. The securing method according to claim 1, wherein a validation by an operator that the lock occupies the locking configuration is implemented in order to authorize the second control of the tilt motor.

3. The securing method according to claim 1, wherein a detection by a detection system that the lock occupies the locking configuration is implemented in order to authorize the second control of the tilt motor.

4. The securing method according to claim 1, wherein, after the second control of the tilt motor, a release phase is implemented with the following steps:

third control of the tilt motor to displace the tilting jib in lifting, with a limitation of the speed parameter to the second maximum speed value and a limitation of the motor torque of the tilt motor to the second torque limit value;

displacement of the lock from the locking configuration to the release configuration.

5. The securing method according to claim 4, wherein the third control of the tilt motor is followed, before or after the displacement of the lock to the release configuration, by a closure of a motor brake associated with the tilt motor.

6. The securing method according to claim 4, wherein the displacement of the lock towards the release configuration is followed by a fourth control of the tilt motor to displace the tilting jib in lifting or lowering, with a limitation of the speed parameter to the first maximum speed value and a limitation of the motor torque to the first torque limit value.

7. The securing method according to claim 6, wherein a validation by an operator that the lock occupies the release configuration is implemented in order to authorize the fourth control of the tilt motor.

8. The securing method according to claim 6, wherein a detection by a detection system that the lock occupies the release configuration is implemented in order to authorize the fourth control of the tilt motor.

9. The securing method according to claim 4, wherein, while considering that the locking holes each extend over a given locking angular sector, the first control of the tilt motor followed by the forward displacement of the lock cause said lock to be substantially in the middle of the locking hole, and the second control of the tilt motor causes the drum to rotate in a lowering direction according to an angular lowering sector substantially equivalent to half of the angular locking sector, and wherein the third control of the tilt motor causes the drum to rotate in a lifting direction, opposite to the lowering direction, according to an tilting angular sector substantially equivalent to half of the angular locking sector.

10. The securing method according to claim 1, wherein, while considering that the locking holes each extend over a given locking angular sector, the first control of the tilt motor followed by the forward displacement of the lock cause said lock to be substantially in the middle of the locking hole, and the second control of the tilt motor causes the drum to rotate in a lowering direction according to an angular lowering sector substantially equivalent to half of the angular locking sector.

11. The securing method according to claim 1, wherein the tilting jib crane is a luffing jib crane or a self-erecting crane.

12. A tilting jib crane comprising a tilting jib displaceable in lifting and in lowering by means of a tilting winch integrating a tilt motor driving a drum on which is wound a tilting rope coupled to the tilting jib, the drum being secured in rotation with a locking platen provided with circumferentially distributed locking holes, and further comprising a lock displaceable between:

a release configuration in which the lock is disengaged from the locking platen to authorize the rotation of the drum and thus allow lifting/lowering of the tilting jib; and a locking configuration in which the lock is engaged inside a locking hole to block the rotation of the drum and thus secure the angular position of the tilting jib;

wherein the locking holes are all oblong arcuate shaped so that the lock is engaged with a circumferential clearance within a locking hole in the locking configuration, the tilting jib crane further comprising:

a measurement system for measuring a speed parameter representative of an angular speed of displacement of the tilting jib, in lifting or in lowering, and a monitoring/control system connected to the tilt motor and to the measurement system, the monitoring/control system being configured to:

perform a first control of the tilt motor to displace the tilting jib in lifting or in lowering, with a limitation of the speed parameter to a first maximum speed value and limitation of a motor torque of the tilt motor to a first torque limit value, until a given angular position of the tilting jib is reached, in which the lock is aligned with one of the locking holes of the locking platen, said lock occupying the release configuration; and after a forward displacement of the lock to occupy a locking configuration in which the lock is engaged inside the locking hole on which the lock is aligned, perform a second control of the tilt motor to displace the tilting jib in lowering, with a limitation of the speed parameter to a second maximum speed value, which is lower than the first maximum speed value, and a limitation of the motor torque of the tilt motor to a second torque limit value, which is lower than the first torque limit value, until the speed parameter is zero for a predetermined time period to stop the tilt motor.

13. The tilting jib crane according to claim 12, comprising a detection system detecting whether the lock occupies the locking configuration or the release configuration, the monitoring/control system being connected to the detection system to receive an item of information about the configuration occupied by the lock.

14. The tilting jib crane according to claim 12, wherein the tilting jib crane is a luffing jib crane or a self-erecting crane.

* * * * *